June 4, 1940.  R. R. R. SARAZIN  2,202,967
VIBRATION DAMPER
Filed Dec. 5, 1938
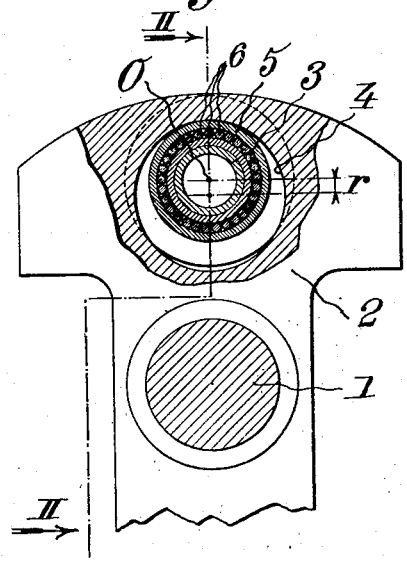
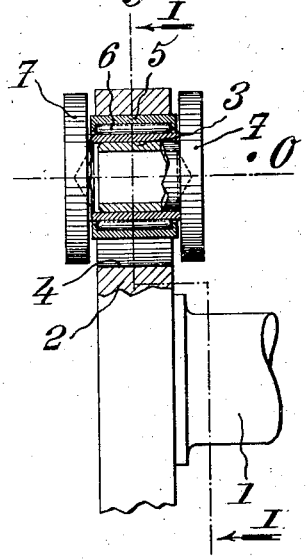
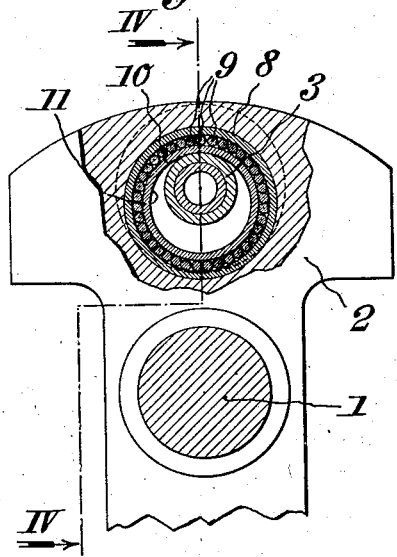
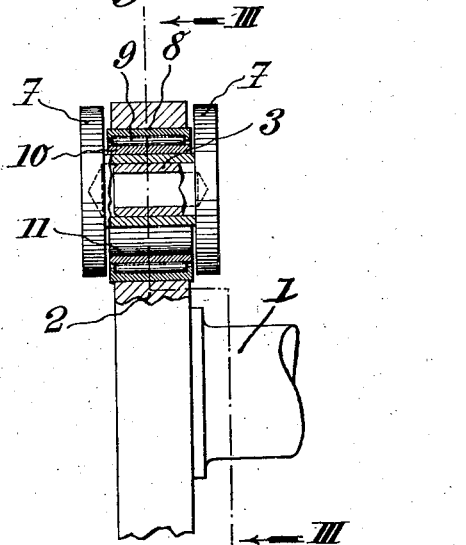
Inventor:
Raoul Roland Raymond Sarazin,
Attorneys Patented June 4, 1940

2,202,967

UNITED STATES PATENT OFFICE 2,202,967

VIBRATION DAMPER

Raoul Roland Raymond Sarazin, Saint Prix, France

Application December 5, 1938, Serial No. 244,094
In Belgium June 24, 1938

8 Claims. (Cl. 74—604)

The present invention relates to pendular devices for absorbing variations of velocity of rotating bodies, and it is more especially, although not exclusively concerned, among devices of this kind, with those used for absorbing the vibrations of engine crankshafts.

The chief object of the present invention is to provide a device of the type above described which is either simpler than prior devices of the same kind used up to the present time or more efficient than other prior devices of the same kind.

It has already been suggested to make the devices of the kind in question by causing a rotating body eccentrically to support masses capable of undergoing a pendular oscillation under the effect of the perturbations which are to be absorbed. When it was desired to absorb vibrations, these masses and their means of suspension were preferably given characteristics such that the period of oscillation of the pendulums thus constituted was substantially equal to that of the perturbing vibration.

In particular, it has been suggested to connect the masses in question with the rotating body through a bifilar suspension, in such manner that, when the pendular movement takes place, the masses do not undergo, as a consequence of this movement, any rotation about their center of gravity, whereby their efficiency is maximum.

On the other hand, it has been suggested to constitute these masses by bodies capable of rolling inside holes eccentrically provided in the rotating body. But, according to this solution of the problem, the pendular movement of the masses produced, in the latter, rotary movements of alternate directions, so that the polar inertia moment of the masses in question exerted a kind of braking effect on the pendular movement and reduced the efficiency of the device.

According to the essential feature of the present invention, the devices of the kind above referred to are constituted by two elements one of which is rigid with the rotating body and carries an eccentric roller track and the other is a mass capable of bearing, under the effect of the centrifugal force, through a single rolling line, against said roller track, and one of these elements carries an intermediate member, free to rotate with respect to said element and capable of ensuring the contact, along said single rolling line, with the other element.

Other features of the present invention will result from the following detailed description of some specific embodiments thereof.

Preferred embodiments of the present invention will be hereinafter described, with reference to the accompanying drawing, given merely by way of example, and in which:

Fig. 1 is a sectional view, on the line I—I of Fig. 2, of a device for absorbing the torsional vibrations of an engine crankshaft, made according to a first embodiment of the present invention;

Fig. 2 is a sectional view, on the line II—II of Fig. 1;

Fig. 3 is a sectional view, on the line III—III of Fig. 4 of a vibration absorbing device made according to a second embodiment of the invention;

Fig. 4 is a sectional view on the line IV—IV of Fig. 3.

In the following description, it will be supposed that, being given a crankshaft $1$, it is desired to absorb torsional vibrations of a well determined order $n$ (that is to say taking place $n$ times per revolution).

This shaft supports a first elements constituted for instance by a crank arm 2, and this element is provided with an eccentric roller track.

A second element is made, which is constituted by a mass 3 capable of bearing, under the effect of the centrifugal force, through a single rolling line, against said roller track.

One of these elements is provided with an intermediate member capable of rotating freely with respect to said element and capable of ensuring the contact, along said single rolling line, with the other element, whereby the relative displacement of the two elements in question is not necessarily associated with a rolling movement of mass 3.

I might of course make such a device in many different manners. However, I have found that the specific arrangements which will now be described are advantageous in practice.

In the first of these embodiments of my invention (shown by Figs. 1 and 2), the eccentric roller track is directly carried by part 2, for instance by cutting therein a cylindrical hole 4 the axis of which is parallel to the axis of revolution of the crankshaft.

Mass 3 is provided with a cylindrical portion adapted to engage in said hole.

Around this cylindrical portion, I provide a ring 5 which constitutes said intermediate member, said ring 5 being capable of turning freely with respect to said cylindrical portion, with the interposition of friction reducing means such as needles 6.

The whole is made in such manner that the difference between the inner diameter of hole 4 and the outer diameter of ring 5 ensures a pendular guiding of the axis o of said cylindrical portion with a radius r corresponding, for the pendulum thus made, to a period of oscillation substantially equal to n.

Advantageously, I arrange the device in such a manner that the center of gravity of mass 3 is located on axis O, in such manner that the stresses to which said mass is subjected under the effect of the torsional vibrations of the shaft have no tendency to cause it to turn about its center of gravity.

For this purpose, mass 3 may be given the shape of a spool diagrammatically indicated by Fig. 2, lateral flanges 7 being then located on either side of part 2 and increasing the inertia moment of the mass about its center of gravity, while making it possible to employ, for the diameter of the median portion of the mass, reduced dimensions which facilitate the assembly and improve the operation.

Of course, if such an embodiment is employed, mass 3 is made of at least two elements if flanges 7 cannot pass through hole 7.

According to the second embodiment of my invention, illustrated by Figs. 3 and 4, the intermediate member is carried by part 2 of the crankshaft. For this purpose, a hole 8 is cut in said part 2, and a ring 10, the inner surface of which is capable of acting as a roller track, 11, is inserted in said hole, with the interposition of friction reducing means, such as needles 9.

Mass 3 is made according to one of the embodiments which have been above described, this mass including in all cases a cylindrical portion capable of bearing directly against the roller track 11.

The whole is made in such manner that the difference between the diameter of the roller track 11 and the diameter of this cylindrical portion of the mass ensures a correct pendular guiding of said mass.

In any case, according to my invnention, I provide a device such that, when the mass is urged to assume a pendular movement, this movement can take place without involving rotations in alternate directions of the mass about its center of gravity.

Owing to its relatively high polar inertia moment and despite the friction, which by the way is very small, that is produced between the intermediate element and the element that carries it, the mass will move pendularly while remaining substantially parallel to itself (relatively to the rotating body) as if it were connected to said rotating body through a bifilar suspension.

Another advantage of the devices which have been described results from the fact that the value of the stresses tangential to the rolling line of the mass against its roller track will be considerably reduced since the only resistance to be overcome will be the polar inertia of the intermediate member (constituted by ring 5 or 10).

As this polar inertia is very low, there is no risk of having, in view of the importance of the centrifugal forces that are brought into play, any sliding displacement between the contacting elements, while, in the case of rollers rolling directly in holes, the importance of the polar inertia of the rollers produces, as soon as the amplitude of the pendular movement exceeds a very small value, a considerable slipping between the contacting surfaces.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the accompanying claims.

What I claim is:

1. A pendular device for damping the vibrations of a rotating body, comprising a structure rigid with said body and having therein a track eccentric with respect to the axis of rotation of said body, a second structure having a bearing portion, and an intermediate member between said bearing portion and said track and freely rotatable with respect to one of said structures, said second structure having a normal position in which its center of gravity is at a maximum distance from the axis of rotation of said body, there being a line rolling contact under the action of centrifugal force between the other of said structures and said intermediate member at a point substantially in alignment with the center of gravity of said second structure and the axis of rotation of said rotating body when said second structure is in said normal position.

2. A pendular device for damping vibrations of a rotating body, comprising a structure rigid with a rotating body and having therein a track eccentric with respect to the axis of rotation of said body, a second structure having a cylindrical bearing portion and having its center of gravity located in the axis of the bearing portion, and an intermediate member between said bearing portion and said track freely rotatable with respect to one of said structures, there being a line rolling contact under the action of centrifugal force between the other of said structures and said intermediate member.

3. A pendular device for damping the vibrations of a rotating body, comprising a structure rigid with said body and having therein a track eccentric with respect to the axis of rotation of said body, a second structure including a mass, and mono-axial bearing means forming the sole connection between said mass and said first structure, said bearing means including a bearing portion, and an intermediate member between said bearing portion and said track and freely rotatable with respect to one of said structures, there being a line rolling contact under the action of centrifugal force between the other of said structures and said intermediate member.

4. A pendular device for damping the vibrations of a rotating body, comprising a structure rigid with said body and having therein a track eccentric with respect to the axis of rotation of said body, a second structure having a bearing portion, an intermediate member between said bearing portion and said track, roller bearings between said intermediate member and one of said structures whereby said member is freely rotatable with respect to said structure, said second structure having a normal position in which its center of gravity is at a maximum distance from the axis of rotation of said rotating body, there being a line rolling contact under the action of centrifugal force between the other of said structures and said intermediate member at a point substantially in alignment with the center of gravity of said second structure and the axis of rotation of said body when said second structure is in said normal position.

5. A pendular device for damping the vibrations of a rotating body, comprising a structure rigid with said body and having therein a hole eccentric with respect to the axis of rotation of said body forming a track, a second structure having a bearing portion, an annular intermediate member between said bearing portion and said track, roller bearings between said intermediate member and one of said structures whereby said member is freely rotatable with respect to said structure, said second structure having a normal position in which its center of gravity is at a maximum distance from the axis of rotation of said rotating body, there being a line rolling contact under the action of centrifugal force between the other of said structures and said intermediate member at a point substantially in alignment with the center of gravity of said second structure and the axis of rotation of said body when said second structure is in said normal position.

6. A pendular device for damping the vibrations of a rotating body, comprising a structure rigid with said body and having therein a hole having its axis parallel to and eccentric with respect to the axis of rotation of said body forming a track, a second structure having a circular bearing portion extending within said hole, and an annular intermediate member between said bearing portion and said track and freely rotatable with respect to one of said structures, said second structure having a normal position in which its center of gravity is at a maximum distance from the axis of rotation of said body, there being a line rolling contact under the action of centrifugal force between the other of said structures and said intermediate member at a point substantially in alignment with the center of gravity of said second structure and the axis of rotation of said rotating body when said second structure is in said normal position.

7. A pendular device for damping the vibrations of a rotating body, comprising a structure rigid with said body and having therein a hole having its axis parallel to and eccentric with respect to the axis of rotation of said body forming a track, a second structure having a circular bearing portion extending within said hole, and an annular intermediate member coaxially mounted on said bearing portion and freely rotatable with respect thereto, said second structure having a normal position in which its center of gravity is at a maximum distance from the axis of rotation of said body, there being a line rolling contact under the action of centrifugal force between said intermediate member and the track at a point substantially in alignment with the center of gravity of said second structure and the axis of rotation of said rotating body when said second structure is in said normal position.

8. A pendular device for damping the vibrations of a rotating body, comprising a structure rigid with said body and having therein a hole parallel to and eccentric with respect to the axis of rotation of said body forming a track, a second structure having a bearing portion extending within said hole, an annular intermediate member coaxially mounted within said hole and freely rotatable with respect to said first structure, said second structure having a normal position in which its center of gravity is at a maximum distance from the axis of rotation of said rotating body, there being a line rolling contact under the action of centrifugal force between said bearing portion and said intermediate member at a point substantially in alignment with the center of gravity of said second structure and the axis of rotation of said body when said second structure is in said normal position.

RAOUL ROLAND RAYMOND SARAZIN.